(12) United States Patent
Behr (10) Patent No.: US 12,230,946 B2
(45) Date of Patent: Feb. 18, 2025

(54) HYBRID LIGHTNING PROTECTION SYSTEM

(71) Applicant: LBA Group, Inc., Greenville, NC (US)

(72) Inventor: Lawrence Behr, Greenville, NC (US)

(73) Assignee: LBA Group, Inc., Greenville, NC (US)

( * ) Notice: Subject to any disclaimer, the term of this patent is extended or adjusted under 35 U.S.C. 154(b) by 267 days.

(21) Appl. No.: 17/992,382

(22) Filed: Nov. 22, 2022

(65) Prior Publication Data

US 2023/0187918 A1 Jun. 15, 2023

Related U.S. Application Data

(60) Provisional application No. 63/287,749, filed on Dec. 9, 2021.

(51) Int. Cl.
*H02G 13/00* (2006.01)
(52) U.S. Cl.
CPC .................................. *H02G 13/80* (2013.01)
(58) Field of Classification Search
None
See application file for complete search history.

(56) References Cited

U.S. PATENT DOCUMENTS

| | | | |
|---|---|---|---|
| 4,447,847 A | 5/1984 | Drulard | |
| 5,159,521 A | 10/1992 | Guangrun et al. | |
| 6,369,317 B1 | 4/2002 | Rapp | |
| 6,692,142 B1 | 2/2004 | Gordin et al. | |
| 6,875,915 B1 | 4/2005 | Chung | |
| 6,930,239 B1 | 8/2005 | Chen | |
| 6,943,285 B2 | 9/2005 | Chung | |
| 7,789,574 B2 | 9/2010 | Broberg | |
| 7,960,647 B2 | 6/2011 | Rizk et al. | |

(Continued)

FOREIGN PATENT DOCUMENTS

| CN | 203503977 U | 3/2014 |
|---|---|---|
| DE | 202008001258 U1 | 3/2008 |

(Continued)

OTHER PUBLICATIONS

International Preliminary Report and Written Opinion received for PCT Patent Application No. PCT/US2017/018378, mailed on May 11, 2017, 14 pages.

(Continued)

*Primary Examiner* — Krystal Robinson
(74) *Attorney, Agent, or Firm* — Ward and Smith, P.A.; Ryan K. Simmons (57) ABSTRACT

A hybrid lightning protection system. The hybrid lightning protection system may include a mast assembly. The mast assembly may include an upper portion including one or more upper mast sections; and a lower portion including one or more lower mast sections, wherein the lower portion supports the upper portion and is connected to a lower most one of the one or more upper mast sections of the upper portion. The hybrid lightning protection system may further include a base mast section, wherein the base mast section supports the mast assembly and is connected to a lower most one of the one or more lower mast sections of the lower portion; and one or more lightning dissipaters disposed at a top portion of an upper most one of the one or more upper mast sections of the upper portion.

19 Claims, 5 Drawing Sheets

(56) References Cited

U.S. PATENT DOCUMENTS

| | | | |
|---|---|---|---|
| 8,373,065 | B2 | 2/2013 | Azuma |
| 9,083,172 | B2 | 7/2015 | Behr |
| 10,916,928 | B2 | 2/2021 | Behr |
| 2011/0006174 | A1 | 1/2011 | Hollinger |
| 2012/0151852 | A1* | 6/2012 | Thoren ................ E04H 12/182 52/111 |
| 2014/0262410 | A1* | 9/2014 | Behr ...................... H02G 13/00 174/3 |
| 2017/0244234 | A1 | 8/2017 | Behr |
| 2018/0212414 | A1 | 7/2018 | Behr |

FOREIGN PATENT DOCUMENTS

| | | |
|---|---|---|
| EP | 2099109 A1 | 9/2009 |
| JP | 2000-077199 A | 3/2000 |
| KR | 100539704 B1 | 12/2005 |
| WO | 2016/000992 A1 | 1/2016 |
| WO | 2017/143196 A1 | 8/2017 |
| WO | 2019/190458 A1 | 10/2019 |

OTHER PUBLICATIONS

International Preliminary Report on Patentability received for PCT Patent Application No. PCT/US2017/018378, mailed on Aug. 30, 2018, 13 pages.

International Search Report and Written Opinion received for PCT Patent Application No. PCT/US18/24331, mailed on Jun. 11, 2018, 8 pages.

\* cited by examiner

HYBRID LIGHTNING PROTECTION SYSTEM

RELATED APPLICATIONS

This application is related and claims priority to U.S. Provisional Patent Application No. 63/287,749, filed on Dec. 9, 2021, the application of which is incorporate herein by reference in its entirety.

TECHNICAL FIELD

The subject matter of the present invention relates generally to a lightning protection system. In particular to a hybrid lightning protection system.

BACKGROUND

Lightning terminals or "lightning rods" are commonly attached to numerous structures such as buildings, cell towers, drilling rigs, and tanks. Generally, these terminals are attached to the highest part of the structure and grounded. Lightning will strike the terminal instead of the structure and follows the least path of resistance to the ground. However, many portable and high value assets are not protected from lightning strikes. Such assets include, for example, portable buildings, airfields, aircraft, ground vehicles, pumping stations, fuel depots, emergency and military command posts, solar cell installations, satellite dish installations, environmental monitoring facilities, etc. Thus, there is a need for a lightning protection system that can be quickly and easily installed adjacent to such assets to provide protection from lightning strikes.

SUMMARY

In one embodiment, a hybrid lightning protection system is provided. The hybrid lightning protection system may include a mast assembly. The mast assembly may include an upper portion including one or more upper mast sections; and a lower portion including one or more lower mast sections, wherein the lower portion supports the upper portion and is connected to a lower most one of the one or more upper mast sections of the upper portion. The hybrid lightning protection system may further include a base mast section, wherein the base mast section supports the mast assembly and is connected to a lower most one of the one or more lower mast sections of the lower portion; and one or more lightning dissipaters disposed at a top portion of an upper most one of the one or more upper mast sections of the upper portion. The base mast section may be configured to be at least partially embedded in a foundation. The base mast section may include a three sided or a four sided lattice type section. The one or more lower mast sections of the lower portion may include three sided or four sided lattice type sections. The one or more upper mast sections of the upper portion may include tubular poles. The system may further include a mounting plate disposed atop an upper most one of the one or more lower mast sections of the lower portion, wherein the mounting plate may be configured to couple the upper portion and lower portion together. The lower most one of the one or more upper mast sections of the upper portion may include one or more radially projecting fins. The mounting plate may include a flat plate including one or more vertical attachment plates positioned and configured to be coupled to one or more of the one or more radially projecting fins. The system may further include one or more ground rods, wherein the one or more ground rods may be configured to be coupled to the mast assembly via one or more ground cables. The one or more ground cables may be configured to be connected to the mast assembly via one or more couplers coupled to the mast assembly. The one or more lightning dissipaters may include a conductive rod, the conductive rod may include either of one or more brushes and/or a brushless terminal. The lower most one of the one or more lower mast sections may be configured to be connected in an end-to-end configuration with the base mast section. The lower most one of the one or more lower mast sections may be configured to be connected in an end-to-end configuration with the base mast section via double bolted joints. The system may further include a hingeable mounting plate disposed atop an upper most end portion of the base mast section, wherein the hingeable mounting plate may be configured to couple the lower portion and the base mast section together in a hingeable configuration. The lower portion may include two or more lower mast sections, and wherein the two or more lower mast sections may be configured to be coupled together in an end-to-end configuration. The two or more lower mast sections may be configured to be coupled together in an end-to-end configuration via double bolted joints. The upper portion may include two or more upper mast sections, and wherein the two or more upper mast sections may be configured to be coupled together in an end-to-end configuration. The two or more upper mast sections may be configured to be coupled together in an end-to-end configuration via one or more threaded couplers. The one or more upper mast sections may be made of aluminum and the one or more lower mast sections may be made of galvanized steel.

In another embodiment, a hybrid catenary lightning protection system is provided. The hybrid catenary lightning protection system may include a first lightning protection system including a first mast assembly including an upper portion having one or more upper mast sections; and a lower portion including one or more lower mast sections, wherein the lower portion supports the upper portion and is connected to a lower most one of the one or more upper mast sections of the upper portion. The first lightning protection system may further include a first base mast section, wherein the first base mast section supports the first mast assembly and is connected to a lower most one of the one or more lower mast sections of the lower portion; and first one or more of lightning dissipaters disposed at a top portion of an upper most one of the one or more upper mast sections of the upper portion. The hybrid catenary lightning protection system may further include a second lightning protection system including a second mast assembly including an upper portion having one or more upper mast sections; and a lower portion including one or more lower mast sections, wherein the lower portion supports the upper portion and is connected to a lower most one of the one or more upper mast sections of the upper portion. The second lightning protection system may further include a second base mast section, wherein the second base mast section supports the second mast assembly and is connected to a lower most one of the one or more lower mast sections of the lower portion; and second one or more of lightning dissipaters disposed at a top portion of an upper most one of the one or more upper mast sections of the upper portion. The hybrid catenary lightning protection system may further include a catenary wire connected between the first lightning protection system and the second lightning protection system.

BRIEF DESCRIPTION OF THE DRAWINGS

Having thus described the subject matter of the present invention in general terms, reference will now be made to the accompanying drawings, which are not necessarily drawn to scale, and wherein:

DETAILED DESCRIPTION

The subject matter of the present invention now will be described more fully hereinafter with reference to the accompanying drawings, in which some, but not all embodiments of the subject matter of the present invention are shown. Like numbers refer to like elements throughout. The subject matter of the present invention may be embodied in many different forms and should not be construed as limited to the embodiments set forth herein; rather, these embodiments are provided so that this disclosure will satisfy applicable legal requirements. Indeed, many modifications and other embodiments of the subject matter of the present invention set forth herein will come to mind to one skilled in the art to which the subject matter of the present invention pertains having the benefit of the teachings presented in the foregoing descriptions and the associated Drawings. Therefore, it is to be understood that the subject matter of the present invention is not to be limited to the specific embodiments disclosed and that modifications and other embodiments are intended to be included within the scope of the appended claims.

In some embodiments, the subject matter of the invention provides a hybrid lightning protection system designed for structural strength and electrical performance.

In some embodiments, the subject matter of the invention provides a hybrid lightning protection system in accordance with the National Fire Protection Association (NFPA) "rolling sphere" method. Wherein, in one example, lightning protection extends to structures up to about 10' height (3 m) at a periphery of about a 60' (18 m) circle from each lightning protection system.

In some embodiments, the subject matter of the invention provides a hybrid lightning protection system designed to withstand nominal, max winds, for example in the range of about 70 mph to about 90 mph, and in one example may withstand about a three (3) second wind gust up to about 110 mph without ice.

Referring now to FIGS. 1-4, illustrate various example embodiments of a hybrid lightning protection system 100 and components in accordance with embodiments of the invention. The lightning protection system 100 may include a mast assembly 105. The mast assembly 105 may include a first portion of one or more lower mast sections 115 and second portion of one or more upper mast sections 120.

Figure 1:
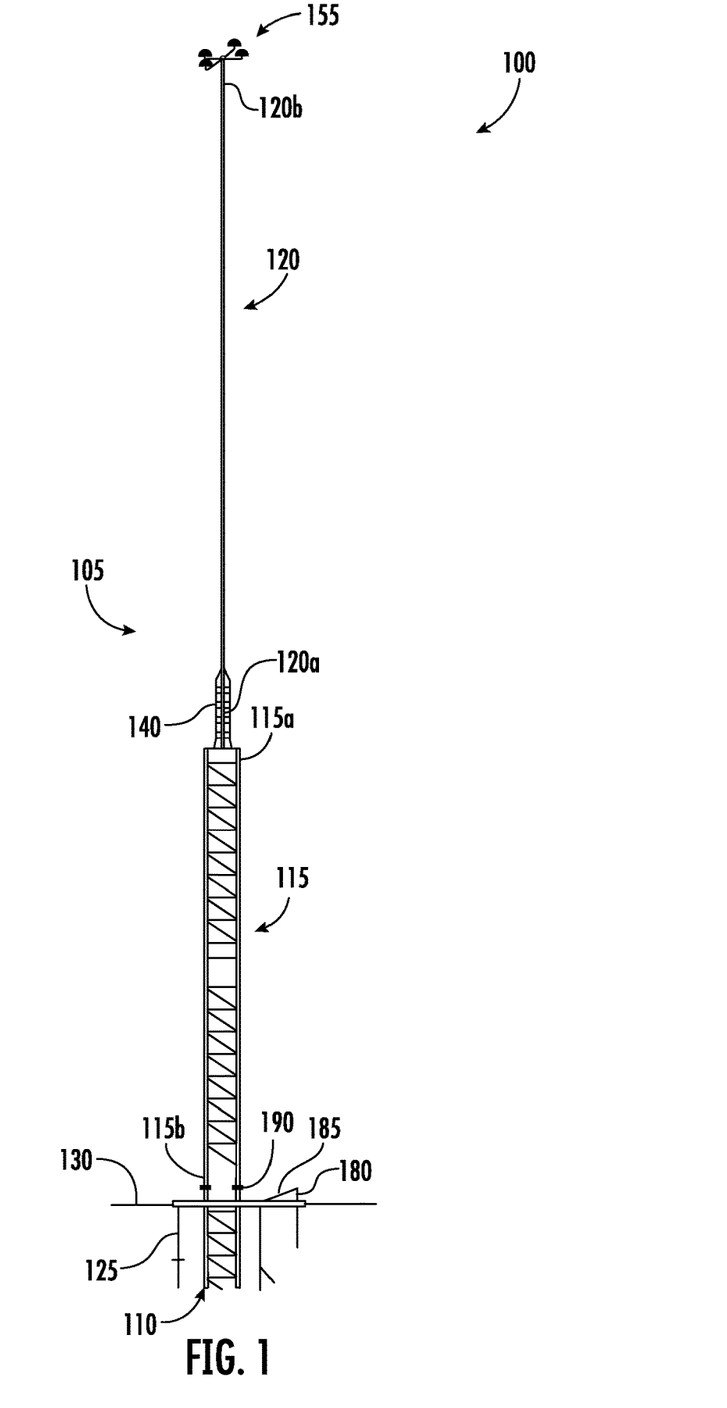
FIG. 1 illustrates an example of a hybrid lightning protection system, in accordance with an embodiment of the invention.
Figure 2:
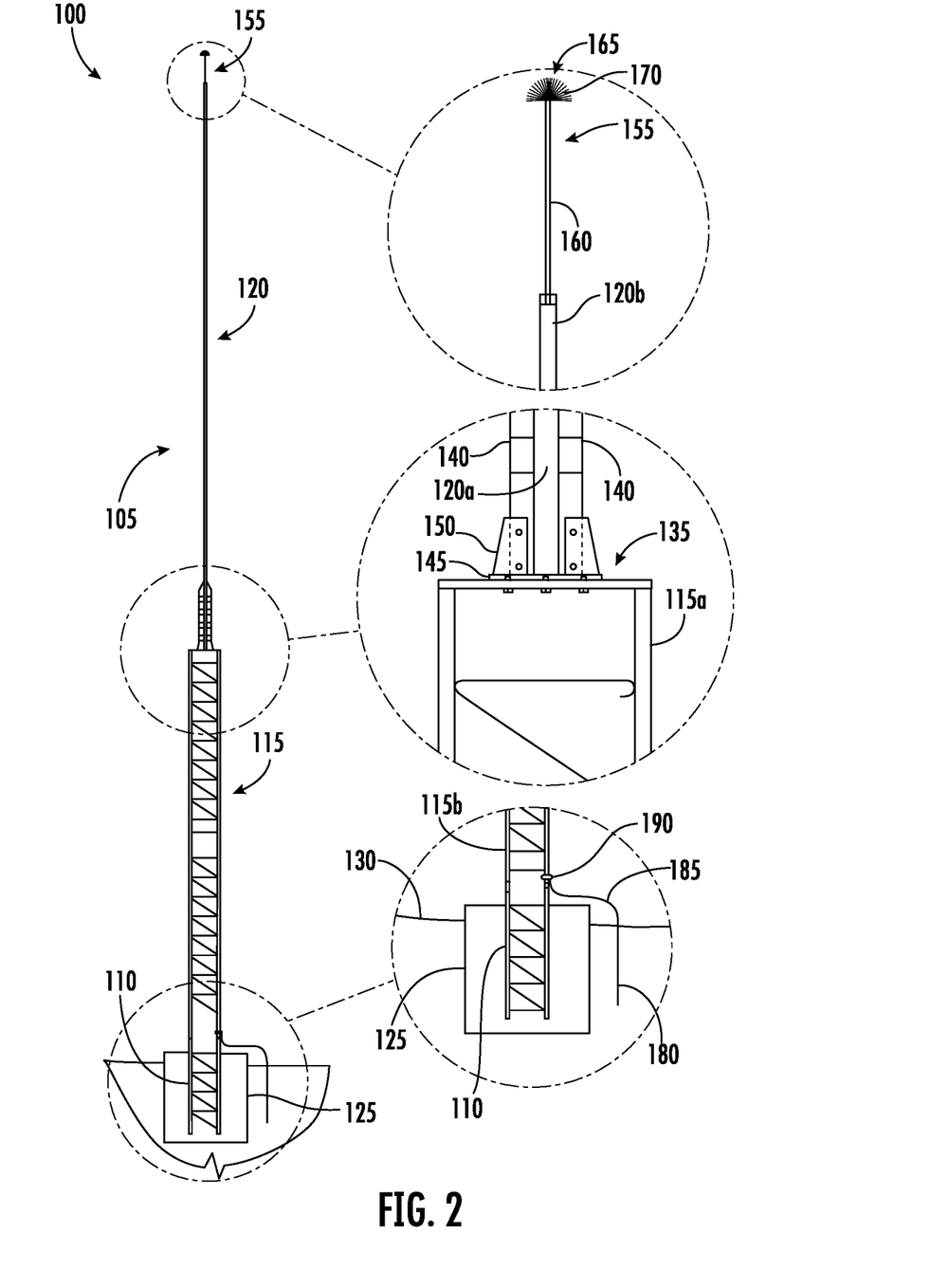
FIG. 2 illustrates an example of a hybrid lightning protection system, in accordance with an embodiment of the invention.

The lightning protection system 100 may further include a base mast section 110. The base mast section 110 supports the mast assembly 105, connecting to the first portion of one or more lower mast sections 115, and is the lowest most portion of lightning protection system 100. The one or more lower mast sections 115 supports the one or more upper mast sections 120, and are positioned between the base mast section 110 and the one or more upper mast sections 120.

The mast assembly 105, when fully erected, may be secured in place by the base section 110. The base section 110, in one embodiment, may be in direct embedment in a foundation 125. For example, the base section 110 may be fully or partially embedded in a foundation 125 made of concrete. In one example, the foundation 125 may extend downward from a ground level 130 down to a depth in the range of about five (5) feet, or any other suitable depth as may be required for its particular application.

In an embodiment that includes a plurality of lower mast sections 115, the lower mast sections 115 may be coupled together end-to-end, via any suitable mechanism and/or technique, such as but not limited to double bolted joints. In one example, each lower mast section 115, may be in the range of about seven (7) feet or about ten (10) feet in length. However, lower mast sections 115 may be of any other suitable length as may be required for its particular application. The one or more lower mast sections 115 may be made of one or more self-supporting tower sections, such as three or four sided lattice type structures.

The bottom most lower mast section 115 may couple in an end-to-end configuration with an upper portion of the base section 110, via any suitable mechanism and/or technique, such as but not limited to double bolted joints. In one example, the bottom most lower mast section 115 may couple with the upper portion of the base section 110 that extends above a top surface of the foundation 125.

In an embodiment that includes a plurality of upper mast sections 120, the upper mast sections 120 may be coupled together end-to-end. In one example, the upper mast sections 120 may be coupled together end-to-end via threaded couplers (not shown), or via any suitable mechanism and/or technique. In one example, the cross-sectional diameter of the upper mast sections 120 may vary from larger to smaller from bottom to top, e.g., from about two (2) inches (50 mm) to about one (1) inch (25 mm). In one example, each upper mast section 120, may be in the range of about six (6) feet in length. However, upper mast sections 120 may be of any other suitable length as may be required for its particular application.

Figure 3:
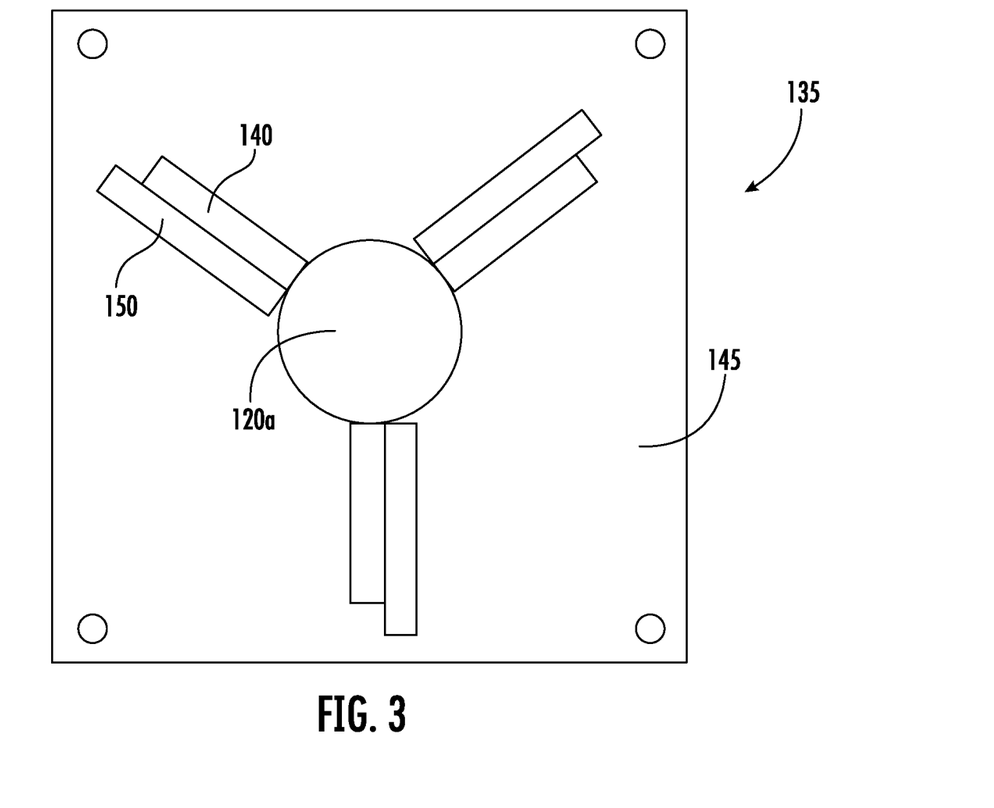
FIG. 3 illustrates an example mounting plate of the hybrid lightning protection system, in accordance with an embodiment of the invention.

In one embodiment, a bottom most upper mast section 120a may couple with an upper most lower mast section 115a, via any suitable mechanism and/or technique. In one example, the upper most lower mast section 115a may include a top mounting plate 135 at its upper most end, wherein the bottom most upper mast section 120a may couple to the top mounting plate 135. In one example, the bottom most upper mast section 120a coupled to the upper most lower mast section 115a, may include one or more radially projecting fins 140, for example, three radially projecting fins 140, for added structural integrity. In one example, as illustrated in FIG. 3, top mounting plate 135 may include a flat plate 145 that may have vertical attachment plates 150 positioned to be bolted to fins 140 of upper mast section 120a. In one embodiment the number of vertical attachment plates 150 corresponds to the number of fins 140, e.g., three.

The lightning protection system 100 is preferably lightweight for easy ground assembly and positioning with, for example, an A-Frame or lift truck. The lightning protection system 100 may preferably be in the range of about 200 lbs. (90 Kg) to about 250 lbs. (113 Kg), e.g., preferably under about 200 lbs. (90 Kg). In one example, the one or more upper mast sections 120 may be made of lightweight high conductivity aluminum or other suitable material for superior performance in the lightning dissipation zone. In one example, the one or more lower mast sections 115 may be made of high conductivity galvanized steel or other suitable material for structural support.

Figure 4A:
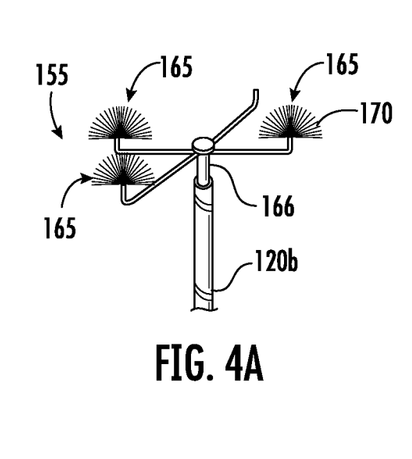
FIGS. 4A and 4C illustrate example lightning dissipaters, in accordance with embodiments of the invention.
Figure 4B:
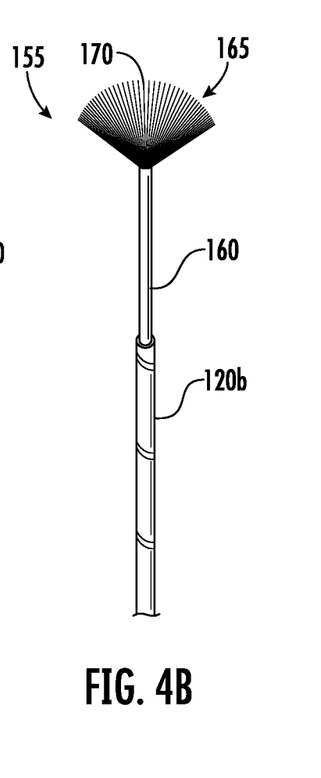
FIG. 4D illustrates a partial cross-sectional view of an example lightning dissipater, in accordance with an embodiment of the invention.
Figure 4C:
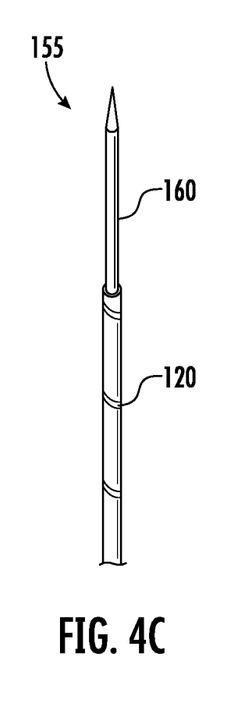
Figure 4D:
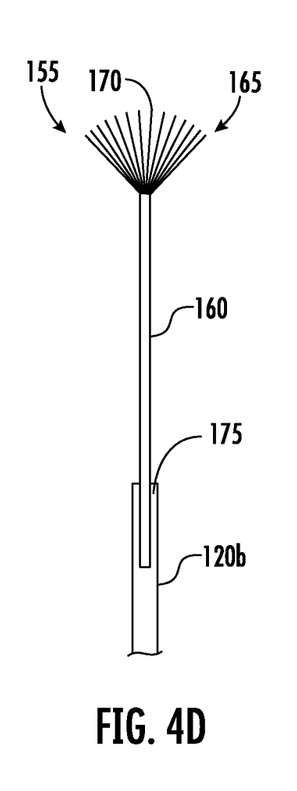

The lightning protection system 100 may further include one or more lightning dissipaters 155. The one or more lightning dissipaters 155 may be installed at the uppermost end of the mast assembly 105. The one or more lightning dissipaters 135 preferably may include a conductive rod 160, e.g., a copper, aluminum, stainless steel, or other suitable material rod, and may further include one or more brushes 165, which may include a plurality of fine conductive wires 170, e.g., in the range of about 10 to about 200 wires, projecting upwardly and outwardly from a top end of the conductive rod 160 and may be generally in the shape of, for example, a brush to dissipate electrical charge. In one embodiment, the one or more lightning dissipaters 155 may be a brushless terminal (e.g., as shown for example in FIG. 4C). In one example, the conductive rod 160 may be inserted into an axial bore 175 extending downwardly from a top end of top most upper mast section 120b. However, the conductive rod 160 may be coupled/connected to the one or more upper mast sections 120b via any suitable mechanism and/or technique. Lightning dissipater 155 may be in the range of about one (1) foot to about five (5) feet in length. It will be understood that other 140 lightning dissipaters may be used in the present invention.

Additionally, the mast sections of the mast assembly 105 and/or base section 110 (and/or the one or more lightning dissipaters 135) may be alodined, anodized, painted, and/or coated with any other protective coating that presents no impediment to the voltage of a lightning flash. Alodining (chemical conversion) is a coating method intended to provide corrosion prevention to aluminum products left unpainted, as well as to improve adhesion of painting processes. Anodizing is the electrochemical oxidation of an aluminum surface designed to produce a stable film of the aluminum's oxide on that surface.

The total height of the lightning protection system 100 may range depending on the needed application. In one non-limiting example, the lightning protection system 100 may be about 52 feet in overall height. In one non-limiting embodiment, the total length of the one or more upper mast sections 120 may be about 32 feet and the total length of the one or more lower mast sections may be about 20 feet, for a total height of the mast assembly 105, when assembled and erected, to about 52 feet from ground level 130. The mast may be increased in typically about 10 foot increments, e.g., up to about 150 feet (45 m). However, the total height of the mast assembly 105 may be any other suitable height as required by its particular application with appropriate structural design.

The lightning protection system 100 may further include one or more ground rods 180 and one or more ground cables 185. One or more ground rods 180 may be coupled to the mast assembly 105 via the one or more ground cables 185, so that lightning has a pathway into the ground from the mast assembly 105. The lightning protection system may further include one or more couplers 190, for example, at a lower portion of a bottom most lower mast section 115b. The coupler 190 is designed to receive, for example, a ground cable 185. The coupler 190 provides a mechanical and electrical connection of the ground cable 185 to the mast assembly 105. The other end of the ground cable 185 may be connected (e.g., via coupler 190) to one of the one or more ground rods 180 that may be driven into the ground. Ground cable 185 may be made of braided copper, for example 2/0-4/0, or other suitable material and/or gauge. In one embodiment, a plurality of ground cables 185 and ground rods 180 are used, with one ground cable 185 being attached at each connection point of the base section 110 with the bottom lower mast section 115b attached thereto. In other embodiments, the lightning protection system 100 may be connected to an existing ground system of the installation site.

Figure 5:
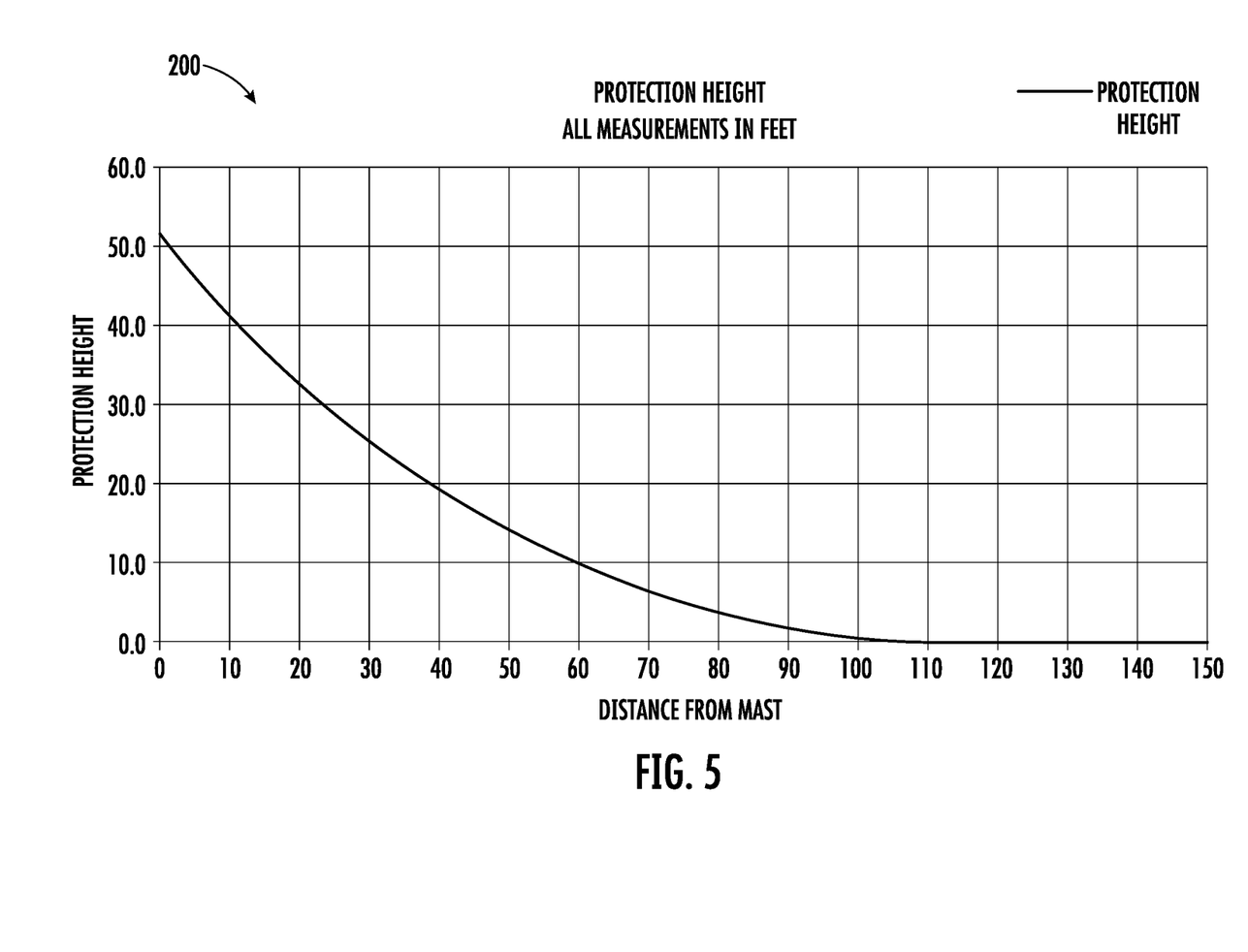
FIG. 5 illustrates a plot of an example zone of protection of a hybrid lightning protection system, in accordance with an embodiment of the invention.

Referring now to FIG. 5 is an example of a plot 200 of a zone of protection of the lightning protection system 100 when installed. The lightning protection system 100 protects a conical zone around it that is calculated by the "rolling ball method." This method is described in National Electrical Code (NEC), or NFPA70 published by the National Fire Protection Association (NFPA) (the contents of which are incorporated herein by reference), as well as the protection radii required for different types of assets. Briefly stated, assets are considered protected when they do not project into the surface of an imaginary sphere of suitable radius when it contacts both the top of the lightning protection system 100 and ground. A frequently used sphere has a radius of about 150 feet (about 45.7 m). The plot 200 indicates an example conical zone of protection for the lightning protection system 100 having a height of about 52 ft.

Following long-standing patent law convention, the terms "a," "an," and "the" refer to "one or more" when used in this application, including the claims. Thus, for example, reference to "a subject" includes a plurality of subjects, unless the context clearly is to the contrary (e.g., a plurality of subjects), and so forth.

Throughout this specification and the claims, the terms "comprise," "comprises," and "comprising" are used in a non-exclusive sense, except where the context requires otherwise. Likewise, the term "include" and its grammatical variants are intended to be non-limiting, such that recitation of items in a list is not to the exclusion of other like items that can be substituted or added to the listed items.

For the purposes of this specification and appended claims, unless otherwise indicated, all numbers expressing amounts, sizes, dimensions, proportions, shapes, formulations, parameters, percentages, quantities, characteristics, and other numerical values used in the specification and claims, are to be understood as being modified in all instances by the term "about" even though the term "about" may not expressly appear with the value, amount or range. Accordingly, unless indicated to the contrary, the numerical parameters set forth in the following specification and attached claims are not and need not be exact, but may be approximate and/or larger or smaller as desired, reflecting tolerances, conversion factors, rounding off, measurement error and the like, and other factors known to those of skill in the art depending on the desired properties sought to be obtained by the subject matter of the present invention. For example, the term "about," when referring to a value can be meant to encompass variations of, in some embodiments ±100%, in some embodiments ±50%, in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed methods or employ the disclosed compositions.

Further, the term "about" when used in connection with one or more numbers or numerical ranges, should be understood to refer to all such numbers, including all numbers in a range and modifies that range by extending the boundaries above and below the numerical values set forth. The recitation of numerical ranges by endpoints includes all numbers, e.g., whole integers, including fractions thereof, subsumed within that range (for example, the recitation of 1 to 5 includes 1, 2, 3, 4, and 5, as well as fractions thereof, e.g., 1.5, 2.25, 3.75, 4.1, and the like) and any range within that range.

Although the foregoing subject matter has been described in some detail by way of illustration and example for purposes of clarity of understanding, it will be understood by those skilled in the art that certain changes and modifications can be practiced within the scope of the appended claims.

That which is claimed:

1. A lightning protection system, comprising:
   a. a mast assembly, comprising:
      i. an upper portion comprise one or more upper mast sections; and
      ii. a lower portion comprise one or more lower mast sections, wherein the lower portion supports the upper portion and is connected to a lower most one of the one or more upper mast sections of the upper portion;
   b. a base mast section, wherein the base mast section supports the mast assembly and is connected to a lower most one of the one or more lower mast sections of the lower portion;
   c. one or more lightning dissipaters disposed at a top portion of an upper most one of the one or more upper mast sections of the upper portion; and
   d. a mounting plate disposed atop an upper most one of the one or more lower mast sections of the lower portion, wherein the mounting plate is configured to couple the upper portion and lower portion together.

2. The lightning protection system of claim 1, wherein the base mast section is configured to be at least partially embedded in a foundation.

3. The lightning protection system of claim 1, wherein the base mast section comprises a three sided or a four sided lattice type section.

4. The lightning protection system of claim 1, wherein the one or more lower mast sections of the lower portion comprises three sided or four sided lattice type sections.

5. The lightning protection system of claim 1, wherein the one or more upper mast sections of the upper portion comprises tubular poles.

6. The lightning protection system of claim 1 wherein the lower most one of the one or more upper mast sections of the upper portion comprises one or more radially projecting fins.

7. The lightning protection system of claim 6, wherein the mounting plate comprises a flat plate including one or more vertical attachment plates positioned and configured to be coupled to one or more of the one or more radially projecting fins.

8. The lightning protection system of claim 1, further comprising one or more ground rods, wherein the one or more ground rods are configured to be coupled to the mast assembly via one or more ground cables.

9. The lightning protection system of claim 1, wherein the one or more ground cables are configured to be connected to the mast assembly via one or more couplers coupled to the mast assembly.

10. The lightning protection system of claim 1, wherein the one or more lightning dissipaters comprise a conductive rod, the conductive rod comprising either of one or more brushes or a brushless terminal.

11. The lightning protection system of claim 1, wherein the lower most one of the one or more lower mast sections is configured to be connected in an end-to-end configuration with the base mast section.

12. The lightning protection system of claim 11, wherein the lower most one of the one or more lower mast sections is configured to be connected in an end-to-end configuration with the base mast section via double bolted joints.

13. The lightning protection system of claim 1, further comprising a hingeable mounting plate disposed atop an upper most end portion of the base mast section, wherein the hingeable mounting plate is configured to couple the lower portion and the base mast section together in a hingeable configuration.

14. The lightning protection system of claim 1, wherein the lower portion comprises two or more lower mast sections, and wherein the two or more lower mast sections are configured to be coupled together in an end-to-end configuration.

15. The lightning protection system of claim 14, wherein the two or more lower mast sections are configured to be coupled together in an end-to-end configuration via double bolted joints.

16. The lightning protection system of claim 1, wherein the upper portion comprises two or more upper mast sections, and wherein the two or more upper mast sections are configured to be coupled together in an end-to-end configuration.

17. The lightning protection system of claim 16, wherein the two or more upper mast sections are configured to be coupled together in an end-to-end configuration via one or more threaded couplers.

18. The lightning protection system of claim 1, wherein the one or more upper mast sections comprise aluminum and the one or more lower mast sections comprise galvanized steel.

19. A lightning protection system, comprising:
   a. a first lightning protection system, comprising:
      i. a first a mast assembly, comprising:
         A. an upper portion comprise one or more upper mast sections; and
         B. a lower portion comprise one or more lower mast sections, wherein the lower portion supports the upper portion and is connected to a lower most one of the one or more upper mast sections of the upper portion;
      ii. a first base mast section, wherein the second base mast section supports the first mast assembly and is connected to a lower most one of the one or more lower mast sections of the lower portion;
      iii. a first one or more of lightning dissipaters disposed at a top portion of an upper most one of the one or more upper mast sections of the upper portion; and
      iv. a first mounting plate disposed atop an upper most one of the one or more lower mast sections of the lower portion of the first mast assembly, wherein the mounting plate is configured to couple the upper portion and lower portion of the first mast assembly together;
   b. a second lightning protection system, comprising:
      i. a second a mast assembly, comprising:
         A. an upper portion comprise one or more upper mast sections; and B. a lower portion comprise one or more lower mast sections, wherein the lower portion supports the upper portion and is connected to a lower most one of the one or more upper mast sections of the upper portion;
ii. a second base mast section, wherein the second base mast section supports the second mast assembly and is connected to a lower most one of the one or more lower mast sections of the lower portion;
iii. a second one or more of lightning dissipaters disposed at a top portion of an upper most one of the one or more upper mast sections of the upper portion; and
iv. a second mounting plate disposed atop an upper most one of the one or more lower mast sections of the lower portion of the second mast assembly, wherein the mounting plate is configured to couple the upper portion and lower portion together of the second mast assembly; and
c. a catenary wire connected between the first lightning protection system and the second lightning protection system.

* * * * *